(12) United States Patent  
Casazza

(10) Patent No.: US 8,618,689 B2  
(45) Date of Patent: Dec. 31, 2013

(54) WIND POWER TURBINE FOR GENERATING ELECTRIC ENERGY

(75) Inventor: Matteo Casazza, Val Di Vizze (IT)

(73) Assignee: Wilic S.AR.L., Luxembourg (LU)

( * ) Notice: Subject to any disclaimer, the term of this patent is extended or adjusted under 35 U.S.C. 154(b) by 469 days.

(21) Appl. No.: 12/951,553

(22) Filed: Nov. 22, 2010

(65) Prior Publication Data

US 2011/0285137 A1     Nov. 24, 2011

(30) Foreign Application Priority Data

Nov. 23, 2009   (IT) .............................. MI2009A2060

(51) Int. Cl.  
*F03D 9/00* (2006.01)

(52) U.S. Cl.  
USPC .............................................. 290/55; 290/44

(58) Field of Classification Search  
USPC ..................................................... 290/55, 44  
See application file for complete search history.

(56) References Cited

U.S. PATENT DOCUMENTS

| | | |
|---|---|---|
| 1,894,357 A | 1/1933 | Manikowske et al. |
| 1,948,854 A | 2/1934 | Heath |
| 1,979,813 A | 11/1934 | Reis |
| 2,006,172 A | 6/1935 | Klappauf |
| 2,040,218 A | 5/1936 | Soderberg |
| 2,177,801 A | 10/1939 | Erren |
| 2,469,734 A | 5/1949 | Ledwith |
| 2,496,897 A | 2/1950 | Strickland |
| 2,655,611 A | 10/1953 | Sherman |
| 2,739,253 A | 3/1956 | Plumb |
| 2,806,160 A | 9/1957 | Brainard |
| 2,842,214 A | 7/1958 | Prewitt |
| 2,903,610 A | 9/1959 | Bessiere |
| 3,004,782 A | 10/1961 | Meermans |
| 3,072,813 A | 1/1963 | Reijnst et al. |
| 3,083,311 A | 3/1963 | Krasnow |
| 3,131,942 A | 5/1964 | Ertaud |
| 3,168,686 A | 2/1965 | King et al. |
| 3,221,195 A | 11/1965 | Hoffmann |
| 3,363,910 A | 1/1968 | Toronchuk |
| 3,364,523 A | 1/1968 | Schippers |

(Continued)

FOREIGN PATENT DOCUMENTS

| | | |
|---|---|---|
| CA | 2404939 | 4/2004 |
| CA | 2518742 | 9/2004 |

(Continued)

OTHER PUBLICATIONS

Maxime R. Dubous, Henk Polinder, Study of TFPM Machines with Toothed Rotor Applied to Direct-Drive Generators for Wind Turbines, 2004.

(Continued)

*Primary Examiner* — Michael Zarroli  
(74) *Attorney, Agent, or Firm* — Neal, Gerber & Eisenberg LLP

(57) ABSTRACT

A wind power turbine configured to generate electric energy, having a supporting structure; a nacelle; a blade assembly rotating with respect to the nacelle; a first and second electric machine having, respectively, a first and second stator, and a first and second rotor substantially coaxial with each other and fitted to the first and second stator to rotate about a first and second axis; and a transmission assembly for connecting the first and second rotor; the transmission assembly being deformable.

31 Claims, 3 Drawing Sheets

(56) References Cited

U.S. PATENT DOCUMENTS

| | | |
|---|---|---|
| 3,392,910 A | 7/1968 | Tanzberger |
| 3,468,548 A | 9/1969 | Webb |
| 3,700,247 A | 10/1972 | Butler et al. |
| 3,724,861 A | 4/1973 | Lesiecki |
| 3,746,349 A | 7/1973 | Smale et al. |
| 3,748,089 A | 7/1973 | Boyer et al. |
| 3,789,252 A | 1/1974 | Abegg |
| 3,841,643 A | 10/1974 | McLean |
| 3,860,843 A | 1/1975 | Kawasaki et al. |
| 3,942,026 A | 3/1976 | Carter |
| 3,963,247 A | 6/1976 | Nommensen |
| 3,968,969 A | 7/1976 | Mayer et al. |
| 4,022,479 A | 5/1977 | Orlowski |
| 4,061,926 A | 12/1977 | Peed |
| 4,087,698 A | 5/1978 | Myers |
| 4,273,343 A | 6/1981 | Visser |
| 4,289,970 A | 9/1981 | Deibert |
| 4,291,235 A | 9/1981 | Bergey, Jr. et al. |
| 4,292,532 A | 9/1981 | Leroux |
| 4,336,649 A | 6/1982 | Glaser |
| 4,339,874 A | 7/1982 | Mc'Carty et al. |
| 4,348,604 A | 9/1982 | Thode |
| 4,350,897 A | 9/1982 | Benoit |
| 4,354,126 A | 10/1982 | Yates |
| 4,368,895 A | 1/1983 | Okamoto et al. |
| 4,398,773 A | 8/1983 | Boden et al. |
| 4,452,046 A | 6/1984 | Valentin |
| 4,482,831 A | 11/1984 | Notaras et al. |
| 4,490,093 A | 12/1984 | Chertok et al. |
| 4,517,483 A | 5/1985 | Hucker et al. |
| 4,517,484 A | 5/1985 | Dacier |
| 4,521,026 A | 6/1985 | Eide |
| 4,585,950 A | 4/1986 | Lund |
| 4,613,779 A | 9/1986 | Meyer |
| 4,638,200 A | 1/1987 | Le Corre et al. |
| 4,648,801 A | 3/1987 | Wilson |
| 4,694,654 A | 9/1987 | Kawamura |
| 4,700,096 A | 10/1987 | Epars |
| 4,714,852 A | 12/1987 | Kawada et al. |
| 4,720,640 A | 1/1988 | Anderson et al. |
| 4,722,661 A | 2/1988 | Mizuno |
| 4,724,348 A | 2/1988 | Stokes |
| 4,761,590 A | 8/1988 | Kaszman |
| 4,792,712 A | 12/1988 | Stokes |
| 4,801,244 A | 1/1989 | Stahl |
| 4,866,321 A | 9/1989 | Blanchard et al. |
| 4,900,965 A | 2/1990 | Fisher |
| 4,906,060 A | 3/1990 | Claude |
| 4,973,868 A | 11/1990 | Wust |
| 4,976,587 A | 12/1990 | Johnston et al. |
| 5,004,944 A | 4/1991 | Fisher |
| 5,063,318 A | 11/1991 | Anderson |
| 5,090,711 A | 2/1992 | Becker |
| 5,091,668 A | 2/1992 | Cuenot et al. |
| 5,177,388 A | 1/1993 | Hotta et al. |
| 5,191,255 A | 3/1993 | Kloosterhouse et al. |
| 5,275,139 A | 1/1994 | Rosenquist |
| 5,280,209 A | 1/1994 | Leupold et al. |
| 5,281,094 A | 1/1994 | McCarty et al. |
| 5,298,827 A | 3/1994 | Sugiyama |
| 5,302,876 A | 4/1994 | Iwamatsu et al. |
| 5,311,092 A | 5/1994 | Fisher |
| 5,315,159 A | 5/1994 | Gribnau |
| 5,331,238 A | 7/1994 | Johnsen |
| 5,410,997 A | 5/1995 | Rosenquist |
| 5,419,683 A | 5/1995 | Peace |
| 5,456,579 A | 10/1995 | Olson |
| 5,483,116 A | 1/1996 | Kusase et al. |
| 5,506,453 A | 4/1996 | McCombs |
| 5,579,800 A | 12/1996 | Walker |
| 5,609,184 A | 3/1997 | Apel et al. |
| 5,663,600 A | 9/1997 | Baek et al. |
| 5,670,838 A | 9/1997 | Everton |
| 5,696,419 A | 12/1997 | Rakestraw et al. |
| 5,704,567 A | 1/1998 | Maglieri |
| 5,746,576 A | 5/1998 | Bayly |
| 5,777,952 A | 7/1998 | Nishimura et al. |
| 5,783,894 A | 7/1998 | Wither |
| 5,793,144 A | 8/1998 | Kusase et al. |
| 5,798,632 A | 8/1998 | Muljadi |
| 5,801,470 A | 9/1998 | Johnson et al. |
| 5,811,908 A | 9/1998 | Iwata et al. |
| 5,814,914 A | 9/1998 | Caamaño |
| 5,844,333 A | 12/1998 | Sheerin |
| 5,844,341 A | 12/1998 | Spooner et al. |
| 5,857,762 A | 1/1999 | Schwaller |
| 5,886,441 A | 3/1999 | Uchida et al. |
| 5,889,346 A | 3/1999 | Uchida et al. |
| 5,894,183 A | 4/1999 | Borchert |
| 5,925,964 A | 7/1999 | Kusase et al. |
| 5,952,755 A | 9/1999 | Lubas |
| 5,961,124 A | 10/1999 | Muller |
| 5,973,435 A | 10/1999 | Irie et al. |
| 5,986,374 A | 11/1999 | Kawakami |
| 5,986,378 A | 11/1999 | Caamano |
| 6,013,968 A | 1/2000 | Lechner et al. |
| 6,037,692 A | 3/2000 | Miekka et al. |
| 6,064,123 A | 5/2000 | Gislason |
| 6,067,227 A | 5/2000 | Katsui et al. |
| 6,089,536 A | 7/2000 | Watanabe et al. |
| 6,093,984 A | 7/2000 | Shiga et al. |
| 6,127,739 A | 10/2000 | Appa |
| 6,172,429 B1 | 1/2001 | Russell |
| 6,177,746 B1 | 1/2001 | Tupper et al. |
| 6,193,211 B1 | 2/2001 | Watanabe et al. |
| 6,194,799 B1 | 2/2001 | Miekka et al. |
| 6,215,199 B1 | 4/2001 | Lysenko et al. |
| 6,232,673 B1 | 5/2001 | Schoo et al. |
| 6,278,197 B1 | 8/2001 | Appa |
| 6,285,090 B1 | 9/2001 | Brutsaert et al. |
| 6,326,711 B1 | 12/2001 | Yamaguchi et al. |
| 6,365,994 B1 | 4/2002 | Watanabe et al. |
| 6,373,160 B1 | 4/2002 | Schrödl |
| 6,376,956 B1 | 4/2002 | Hosoya |
| 6,378,839 B2 | 4/2002 | Watanabe et al. |
| 6,384,504 B1 | 5/2002 | Elrhart et al. |
| 6,417,578 B1 | 7/2002 | Chapman et al. |
| 6,428,011 B1 | 8/2002 | Oskouei |
| 6,452,287 B1 | 9/2002 | Looker |
| 6,452,301 B1 | 9/2002 | Van Dine et al. |
| 6,455,976 B1 | 9/2002 | Nakano |
| 6,472,784 B2 | 10/2002 | Miekka et al. |
| 6,474,653 B1 | 11/2002 | Hintenlang et al. |
| 6,476,513 B1 | 11/2002 | Gueorguiev |
| 6,483,199 B2 | 11/2002 | Umemoto et al. |
| 6,492,743 B1 | 12/2002 | Appa |
| 6,492,754 B1 | 12/2002 | Weiglhofer et al. |
| 6,499,532 B1 | 12/2002 | Williams |
| 6,504,260 B1 | 1/2003 | Debleser |
| 6,515,390 B1 | 2/2003 | Lopatinsky et al. |
| 6,520,737 B1 | 2/2003 | Fischer et al. |
| 6,548,932 B1 | 4/2003 | Weiglhofer et al. |
| 6,590,312 B1 | 7/2003 | Seguchi et al. |
| 6,603,232 B2 | 8/2003 | Van Dine et al. |
| 6,617,747 B1 | 9/2003 | Petersen |
| 6,629,358 B2 | 10/2003 | Setiabudi et al. |
| 6,664,692 B1 | 12/2003 | Kristoffersen |
| 6,676,122 B1 | 1/2004 | Wobben |
| 6,683,397 B2 | 1/2004 | Gauthier et al. |
| 6,700,260 B2 | 3/2004 | Hsu et al. |
| 6,700,288 B2 | 3/2004 | Smith |
| 6,707,224 B1 | 3/2004 | Petersen |
| 6,720,688 B1 | 4/2004 | Schiller |
| 6,727,624 B2 | 4/2004 | Morita et al. |
| 6,746,217 B2 | 6/2004 | Kim et al. |
| 6,759,758 B2 | 7/2004 | Martinez |
| 6,762,525 B1 | 7/2004 | Maslov et al. |
| 6,781,276 B1 | 8/2004 | Stiesdal et al. |
| 6,784,564 B1 | 8/2004 | Wobben |
| 6,794,781 B2 | 9/2004 | Razzell et al. |
| 6,828,710 B1 | 12/2004 | Gabrys |
| 6,833,632 B2 * | 12/2004 | Becker et al. .................. 290/55 |
| 6,856,042 B1 | 2/2005 | Kubota |
| 6,879,075 B2 | 4/2005 | Calfo et al. |

(56) References Cited

U.S. PATENT DOCUMENTS

| | | |
|---|---|---|
| 6,888,262 B2 | 5/2005 | Blakemore |
| 6,891,299 B2 | 5/2005 | Coupart et al. |
| 6,903,466 B1 | 6/2005 | Mercier et al. |
| 6,903,475 B2 | 6/2005 | Ortt et al. |
| 6,906,444 B2 | 6/2005 | Hattori et al. |
| 6,911,741 B2 | 6/2005 | Pettersen et al. |
| 6,921,243 B2 | 7/2005 | Canini et al. |
| 6,931,834 B2 | 8/2005 | Jones |
| 6,933,645 B1 | 8/2005 | Watson |
| 6,933,646 B2 | 8/2005 | Kinoshita |
| 6,942,454 B2 | 9/2005 | Ohlmann |
| 6,945,747 B1 | 9/2005 | Miller |
| 6,949,860 B2 | 9/2005 | Hama et al. |
| 6,951,443 B1 | 10/2005 | Blakemore |
| 6,972,498 B2 | 12/2005 | Jamieson et al. |
| 6,983,529 B2 | 1/2006 | Ortt et al. |
| 6,984,908 B2 | 1/2006 | Rinholm et al. |
| 6,987,342 B2 | 1/2006 | Hans |
| 6,998,729 B1 | 2/2006 | Wobben |
| 7,004,724 B2 | 2/2006 | Pierce et al. |
| 7,008,172 B2 | 3/2006 | Selsam |
| 7,008,348 B2 | 3/2006 | LaBath |
| 7,016,006 B2 | 3/2006 | Song |
| 7,021,905 B2 | 4/2006 | Torrey et al. |
| 7,028,386 B2 | 4/2006 | Kato et al. |
| 7,033,139 B2 | 4/2006 | Wobben |
| 7,038,343 B2 | 5/2006 | Agnes et al. |
| 7,042,109 B2 | 5/2006 | Gabrys |
| 7,057,305 B2 | 6/2006 | Krüger-Gotzmann et al. |
| 7,075,192 B2 | 7/2006 | Bywaters et al. |
| 7,081,696 B2 | 7/2006 | Ritchey |
| 7,088,024 B2 | 8/2006 | Agnes et al. |
| 7,091,642 B2 | 8/2006 | Agnes et al. |
| 7,095,128 B2 | 8/2006 | Canini et al. |
| 7,098,552 B2 | 8/2006 | McCoin |
| 7,109,600 B1 | 9/2006 | Bywaters et al. |
| 7,111,668 B2 | 9/2006 | Rürup |
| 7,116,006 B2 | 10/2006 | McCoin |
| 7,119,469 B2 | 10/2006 | Ortt et al. |
| 7,154,191 B2 | 12/2006 | Jansen et al. |
| 7,161,260 B2 | 1/2007 | Krüger-Gotzmann et al. |
| 7,166,942 B2 | 1/2007 | Yokota |
| 7,168,248 B2 | 1/2007 | Sakamoto et al. |
| 7,168,251 B1 | 1/2007 | Janssen |
| 7,179,056 B2 | 2/2007 | Sieffriedsen |
| 7,180,204 B2 | 2/2007 | Grant et al. |
| 7,183,665 B2 | 2/2007 | Bywaters et al. |
| 7,196,446 B2 | 3/2007 | Hans |
| 7,205,678 B2 | 4/2007 | Casazza et al. |
| 7,217,091 B2 | 5/2007 | LeMieux |
| 7,259,472 B2 | 8/2007 | Miyake et al. |
| 7,281,501 B2 | 10/2007 | Leufen et al. |
| 7,285,890 B2 | 10/2007 | Jones et al. |
| 7,323,792 B2 | 1/2008 | Sohn |
| 7,345,376 B2 | 3/2008 | Costin |
| 7,358,637 B2 | 4/2008 | Tapper |
| 7,377,163 B2 | 5/2008 | Miyagawa |
| 7,385,305 B2 | 6/2008 | Casazza et al. |
| 7,385,306 B2 | 6/2008 | Casazza et al. |
| 7,392,988 B2 | 7/2008 | Moldt et al. |
| 7,427,814 B2 | 9/2008 | Bagepalli et al. |
| 7,431,567 B1 | 10/2008 | Bevington et al. |
| 7,443,066 B2 | 10/2008 | Salamah et al. |
| 7,458,261 B2 | 12/2008 | Miyagawa |
| 7,482,720 B2 | 1/2009 | Gordon et al. |
| 7,548,008 B2 | 6/2009 | Jansen et al. |
| 7,550,863 B2 | 6/2009 | Versteegh |
| 7,687,932 B2 | 3/2010 | Casazza et al. |
| 2002/0047418 A1 | 4/2002 | Seguchi et al. |
| 2002/0047425 A1 | 4/2002 | Coupart et al. |
| 2002/0056822 A1 | 5/2002 | Watanabe et al. |
| 2002/0063485 A1 | 5/2002 | Lee et al. |
| 2002/0089251 A1 | 7/2002 | Tajima et al. |
| 2002/0148453 A1 | 10/2002 | Watanabe et al. |
| 2003/0011266 A1 | 1/2003 | Morita et al. |
| 2003/0102677 A1 | 6/2003 | Becker et al. |
| 2003/0137149 A1 | 7/2003 | Northrup et al. |
| 2003/0230899 A1 | 12/2003 | Martinez |
| 2004/0086373 A1 | 5/2004 | Page, Jr. |
| 2004/0094965 A1 | 5/2004 | Kirkegaard et al. |
| 2004/0119292 A1 | 6/2004 | Datta et al. |
| 2004/0150283 A1 | 8/2004 | Calfo et al. |
| 2004/0151575 A1 | 8/2004 | Pierce et al. |
| 2004/0151577 A1 | 8/2004 | Pierce et al. |
| 2004/0189136 A1 | 9/2004 | Kolomeitsev et al. |
| 2005/0002783 A1 | 1/2005 | Hiel et al. |
| 2005/0002787 A1 | 1/2005 | Wobben |
| 2005/0082839 A1 | 4/2005 | McCoin |
| 2005/0230979 A1 | 10/2005 | Bywaters et al. |
| 2005/0280264 A1 | 12/2005 | Nagy |
| 2006/0000269 A1 | 1/2006 | LeMieux et al. |
| 2006/0001269 A1 | 1/2006 | Jansen et al. |
| 2006/0006658 A1 | 1/2006 | McCoin |
| 2006/0012182 A1 | 1/2006 | McCoin |
| 2006/0028025 A1 | 2/2006 | Kikuchi et al. |
| 2006/0066110 A1 | 3/2006 | Jansen et al. |
| 2006/0071575 A1 | 4/2006 | Jansen et al. |
| 2006/0091735 A1 | 5/2006 | Song et al. |
| 2006/0125243 A1 | 6/2006 | Miller |
| 2006/0131985 A1 | 6/2006 | Qu et al. |
| 2006/0152012 A1 | 7/2006 | Wiegel et al. |
| 2006/0152015 A1 | 7/2006 | Bywaters et al. |
| 2006/0152016 A1 | 7/2006 | Bywaters et al. |
| 2007/0020109 A1 | 1/2007 | Takahashi et al. |
| 2007/0116567 A1 | 5/2007 | Luetze |
| 2007/0187954 A1 | 8/2007 | Struve et al. |
| 2007/0187956 A1 | 8/2007 | Wobben |
| 2007/0222223 A1 | 9/2007 | Bagepalli et al. |
| 2007/0222226 A1 | 9/2007 | Casazza et al. |
| 2007/0222227 A1 | 9/2007 | Casazza et al. |
| 2008/0003105 A1 | 1/2008 | Nies |
| 2008/0025847 A1 | 1/2008 | Teipen |
| 2008/0050234 A1 | 2/2008 | Ingersoll et al. |
| 2008/0107526 A1 | 5/2008 | Wobben |
| 2008/0118342 A1 | 5/2008 | Seidel et al. |
| 2008/0197636 A1 | 8/2008 | Tilscher et al. |
| 2008/0197638 A1 | 8/2008 | Wobben |
| 2008/0246224 A1 | 10/2008 | Pabst et al. |
| 2008/0290664 A1 | 11/2008 | Kruger |
| 2008/0303281 A1 | 12/2008 | Krueger |
| 2008/0309189 A1 | 12/2008 | Pabst et al. |
| 2008/0315594 A1 | 12/2008 | Casazza et al. |
| 2009/0045628 A1 | 2/2009 | Erdman et al. |
| 2009/0060748 A1 | 3/2009 | Landa et al. |
| 2009/0094981 A1 | 4/2009 | Eggleston |
| 2009/0096309 A1 | 4/2009 | Pabst et al. |
| 2009/0302702 A1 | 12/2009 | Pabst et al. |
| 2010/0019570 A1 | 1/2010 | Pabst et al. |
| 2010/0026010 A1* | 2/2010 | Pabst .............................. 290/55 |
| 2010/0117362 A1 | 5/2010 | Vihriala et al. |
| 2010/0123318 A1 | 5/2010 | Casazza et al. |

FOREIGN PATENT DOCUMENTS

| | | |
|---|---|---|
| CN | 1554867 | 12/2004 |
| DE | 3638129 | 5/1988 |
| DE | 3718954 | 12/1988 |
| DE | 3844505 | 7/1990 |
| DE | 3903399 | 8/1990 |
| DE | 4304577 | 8/1994 |
| DE | 4402184 | 8/1995 |
| DE | 4415570 | 11/1995 |
| DE | 4444757 | 6/1996 |
| DE | 19636591 | 3/1998 |
| DE | 19644355 | 4/1998 |
| DE | 19652673 | 6/1998 |
| DE | 19711869 | 9/1998 |
| DE | 19748716 | 11/1998 |
| DE | 19801803 | 4/1999 |
| DE | 19932394 | 1/2001 |
| DE | 19947915 | 4/2001 |
| DE | 19951594 | 5/2001 |
| DE | 10000370 | 7/2001 |
| DE | 10219190 | 11/2003 |

(56) References Cited

FOREIGN PATENT DOCUMENTS

| | | |
|---|---|---|
| DE | 10246690 | 4/2004 |
| DE | 102004018524 | 11/2005 |
| DE | 102004028746 | 12/2005 |
| EP | 0013157 | 7/1980 |
| EP | 0232963 | 8/1987 |
| EP | 0313392 | 4/1989 |
| EP | 0627805 | 12/1994 |
| EP | 1108888 | 6/2001 |
| EP | 1167754 | 1/2002 |
| EP | 1289097 | 3/2003 |
| EP | 1291521 | 3/2003 |
| EP | 1309067 | 5/2003 |
| EP | 1363019 | 11/2003 |
| EP | 1375913 | 1/2004 |
| EP | 1394406 | 3/2004 |
| EP | 1394451 | 3/2004 |
| EP | 1589222 | 10/2005 |
| EP | 1612415 | 1/2006 |
| EP | 1641102 | 3/2006 |
| EP | 1677002 | 7/2006 |
| EP | 1772624 | 4/2007 |
| EP | 1780409 | 5/2007 |
| EP | 1829762 | 9/2007 |
| EP | 1921311 | 5/2008 |
| EP | 2060786 | 5/2009 |
| ES | 2140301 | 2/2000 |
| FR | 2594272 | 8/1987 |
| FR | 2760492 | 9/1998 |
| FR | 2796671 | 1/2001 |
| FR | 2798168 | 3/2001 |
| FR | 2810374 | 12/2001 |
| FR | 2882404 | 8/2006 |
| GB | 191317268 | 3/1914 |
| GB | 859176 | 1/1961 |
| GB | 1524477 | 9/1978 |
| GB | 1537729 | 1/1979 |
| GB | 2041111 | 9/1980 |
| GB | 2050525 | 1/1981 |
| GB | 2075274 | 11/1981 |
| GB | 2131630 | 6/1984 |
| GB | 2144587 | 3/1985 |
| GB | 2208243 | 3/1989 |
| GB | 2266937 | 11/1993 |
| GB | 2372783 | 9/2002 |
| JP | 57059462 | 4/1982 |
| JP | 3145945 | 6/1991 |
| JP | 5122912 | 5/1993 |
| JP | 6002970 | 1/1994 |
| JP | 6269141 | 9/1994 |
| JP | 10-070858 | 3/1998 |
| JP | 11236977 | 8/1999 |
| JP | 11-299197 | 10/1999 |
| JP | 2000-134885 | 5/2000 |
| JP | 2001-057750 | 2/2001 |
| JP | 2003453072 | 7/2003 |
| JP | 2004-153913 | 5/2004 |
| JP | 2004-297947 | 10/2004 |
| JP | 2005-006375 | 1/2005 |
| JP | 2005-020906 | 1/2005 |
| JP | 2005-312150 | 11/2005 |
| NL | 8902534 | 5/1991 |
| RU | 2229621 | 5/2004 |
| WO | WO8402382 | 6/1984 |
| WO | WO9105953 | 5/1991 |
| WO | WO9212343 | 7/1992 |
| WO | WO9730504 | 8/1997 |
| WO | WO9733357 | 9/1997 |
| WO | WO9840627 | 9/1998 |
| WO | WO9930031 | 6/1999 |
| WO | WO9933165 | 7/1999 |
| WO | WO9937912 | 7/1999 |
| WO | WO9939426 | 8/1999 |
| WO | WO0001056 | 1/2000 |
| WO | WO0106121 | 1/2001 |
| WO | WO0106623 | 1/2001 |
| WO | WO0107784 | 2/2001 |
| WO | WO0121956 | 3/2001 |
| WO | WO0125631 | 4/2001 |
| WO | WO0129413 | 4/2001 |
| WO | WO0134973 | 5/2001 |
| WO | WO0135517 | 5/2001 |
| WO | WO0169754 | 9/2001 |
| WO | WO0233254 | 4/2002 |
| WO | WO02057624 | 7/2002 |
| WO | WO02083523 | 10/2002 |
| WO | WO03036084 | 5/2003 |
| WO | WO03067081 | 8/2003 |
| WO | WO03076801 | 9/2003 |
| WO | WO2004017497 | 2/2004 |
| WO | WO2004042227 | 5/2004 |
| WO | WO2005103489 | 11/2005 |
| WO | WO2006013722 | 2/2006 |
| WO | WO2006032515 | 3/2006 |
| WO | WO2007063370 | 6/2007 |
| WO | WO2007110718 | 10/2007 |
| WO | WO2008052562 | 5/2008 |
| WO | WO2008078342 | 7/2008 |
| WO | WO2008086608 | 7/2008 |
| WO | WO2008098573 | 8/2008 |
| WO | WO2008102184 | 8/2008 |
| WO | WO2008116463 | 10/2008 |
| WO | WO2008131766 | 11/2008 |

OTHER PUBLICATIONS

Variable Speed Gearless Wind Turbine (website), http://www.mhi.cojp/msmw/mw/en/gearless.html, viewed on Sep. 22, 2006.

* cited by examiner

WIND POWER TURBINE FOR GENERATING ELECTRIC ENERGY

PRIORITY CLAIM

This application claims the benefit of and priority to Italian Patent Application No. MI2009A 002060, filed on Nov. 23, 2009, the entire contents of which are incorporated herein.

BACKGROUND

Certain known wind power turbines are described in the following patent documents: WO 2008/078342 A1; EP 1,363,019 A2; DE 196 52 673 A1; DE 38 44 505 A1; ES 2,140,301 A2; EP 1,589,222 A2; DE 297 06 98011; and FR 2,810,374 A1.

One known high-power wind power turbine is described in the FIG. 1, 4, 5, 6, 9, 11, 12, 13, 16, 17 embodiments of WO 2008/078342. In this PCT patent application, the wind power turbine comprises at least two electric machines on opposite sides of the supporting structure.

The technical solutions of certain known wind power turbines provide for balanced mass distribution with respect to the supporting structure, and for extremely easy assembly, but the transmission assembly between the first and second electric machine poses other problems. For example, any oscillation of the first rotor is amplified in the second. More specifically, the first rotor being connected directly to the blade assembly, wind action on the blade assembly may result in displacement of the first rotor, substantially in the form of a slight variation in the concentricity of the first rotor and first stator and/or in the slope of the first axis, which are considered acceptable within a given range. A variation in the slope of the first axis displaces the second rotor in direct proportion to the distance between the first and second rotor, and may possibly result in displacement of the second rotor that is no longer acceptable. Generally speaking, displacement of the first and second rotor is considered unacceptable when it reduces the air gap to such an extent as to impair operation of the first and/or second electric machine, or when it reduces the working life of parts of the first and/or second electric machine supporting the first and/or second rotor respectively. Displacement could be limited by supporting the first and second rotor using hyperstatic systems. This solution, however, would increase the weight and complicate the design of the wind power turbine, would limit access to the active parts of the first and second electric machine, and would increase stress and wear.

Another technical problem for certain known wind power turbines is the high degree of precision involved in manufacturing and assembling the component parts of the first and second electric machine to ensure optimum performance of the wind power turbine (i.e., performance ensuring maximum efficiency of the first and second electric machine in relation to wear). In other words: the active parts of the first and second rotor must be positioned completely facing the active parts of the first and second stator respectively; and the first and second stator must have coincident axes of symmetry, and the first and second axis must be coincident.

Even only minor dimensional differences in the fabrication or assembly of the first and second electric machine could result in asymmetry or misalignment, and therefore impaired operation, of the first and second electric machine.

Additionally, differences in thermal expansion in the first and second electric machine and in the transmission assembly pose another technical problem for certain known wind power turbines. That is, the first and second electric machine comprise metal structures made of different materials and subject, by position and function, to different degrees of overheating. And, in actual use, differences in thermal expansion may result in asymmetry or misalignment of parts of the first and second electric machine, and in the transmission assembly.

SUMMARY

The present disclosure relates to a wind power turbine for generating electric energy.

More specifically, the present disclosure relates to a wind power turbine comprising a supporting structure; a nacelle; a blade assembly rotating with respect to the nacelle; a first and second electric machine comprising, respectively, a first and second stator substantially coaxial with each other, and a first and second rotor fitted to the first and second stator to rotate about a first and second axis; and a transmission assembly connecting the first rotor to the second rotor.

It is thus an object of the present disclosure to provide a wind power turbine, for generating electric energy, designed to eliminate the drawbacks of certain known wind power turbines.

Another object of the present disclosure is to provide a wind power turbine, for generating electric energy, designed to reduce displacement of the second rotor.

Moreover, another object of the present disclosure is to provide a wind power turbine, for generating electric energy, which is less affected by dimensional differences in the fabrication or assembly of parts of the first and second electric machine.

Furthermore, another object of the present disclosure is to provide a wind power turbine, for generating electric energy, which is less sensitive to differences in thermal expansion.

According to one embodiment of the present disclosure, there is provided a wind power turbine for generating electric energy, the wind power turbine comprising a supporting structure; a nacelle; a blade assembly rotating with respect to the nacelle; and a first and second electric machine comprising, respectively, a first and second stator substantially coaxial with each other, and a first and second rotor fitted to the first and second stator to rotate about a first and second axis; the wind power turbine comprising a transmission assembly connecting the first rotor to the second rotor; and the transmission assembly being deformable to permit relative movement between the first and second electric machine. The transmission assembly of this embodiment deforms to absorb stress, and reduces the stress transmitted to the second rotor.

In one embodiment, the transmission assembly comprises at least one elastic joint and a transmission shaft. The transmission shaft of this embodiment couples operatively the first rotor functionally to the second rotor, and the elastic joint deforms elastically to reduce the stress transmitted by the first to the second rotor.

In another embodiment, the first and second electric machine are annular generators; the first and second rotor comprising a first and second hollow rotor drum respectively; the transmission shaft comprising a hollow cylinder; and the elastic joint being annular, to connect the inside of the first rotor to the inside of the second rotor. Such an embodiment provides that the first rotor, the transmission shaft, the elastic joint, and the second rotor are designed to allow air to flow inside them, so the first and second electric machine can be cooled with air, such as air supplied from outside the wind power turbine.

In another embodiment of the present disclosure, the hollow cylinder and the elastic joint have respective outside diameters smaller than the outside diameter of the first and second rotor drum; and the first and second rotor are divided into rotor segments, and the first and second stator are divided into stator segments. Such an embodiment provides that the stator segments and rotor segments are accessible, and can be extracted axially.

In another embodiment of the present disclosure, the hollow cylinder and the elastic joint have respective inside diameters allowing passage by an operator for inspection or maintenance. Such an embodiment provides an operator access is permitted to the first rotor, the blade assembly, and the second rotor, for inspection or maintenance.

Additional features and advantages are described in, and will be apparent from, the following Detailed Description and the figures.

BRIEF DESCRIPTION OF THE DRAWINGS

A number of non-limiting embodiments of the present disclosure will be described by way of example with reference to the accompanying drawings, in which.

DETAILED DESCRIPTION

Figure 1:
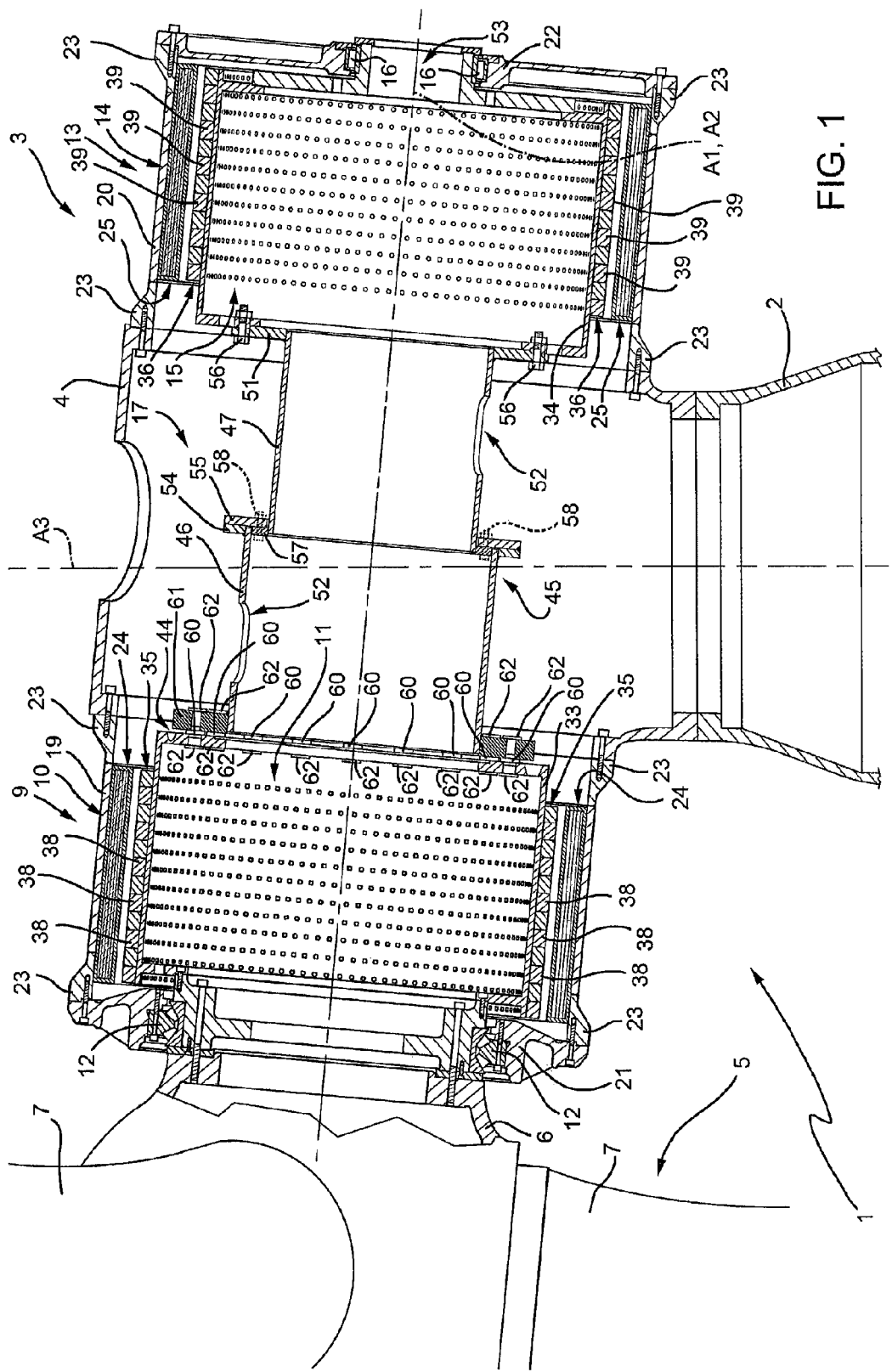
FIG. 1 shows an enlarged, partly sectioned side view, with parts removed for clarity, of a wind power turbine in accordance with a first embodiment of the present disclosure.
Figure 2:
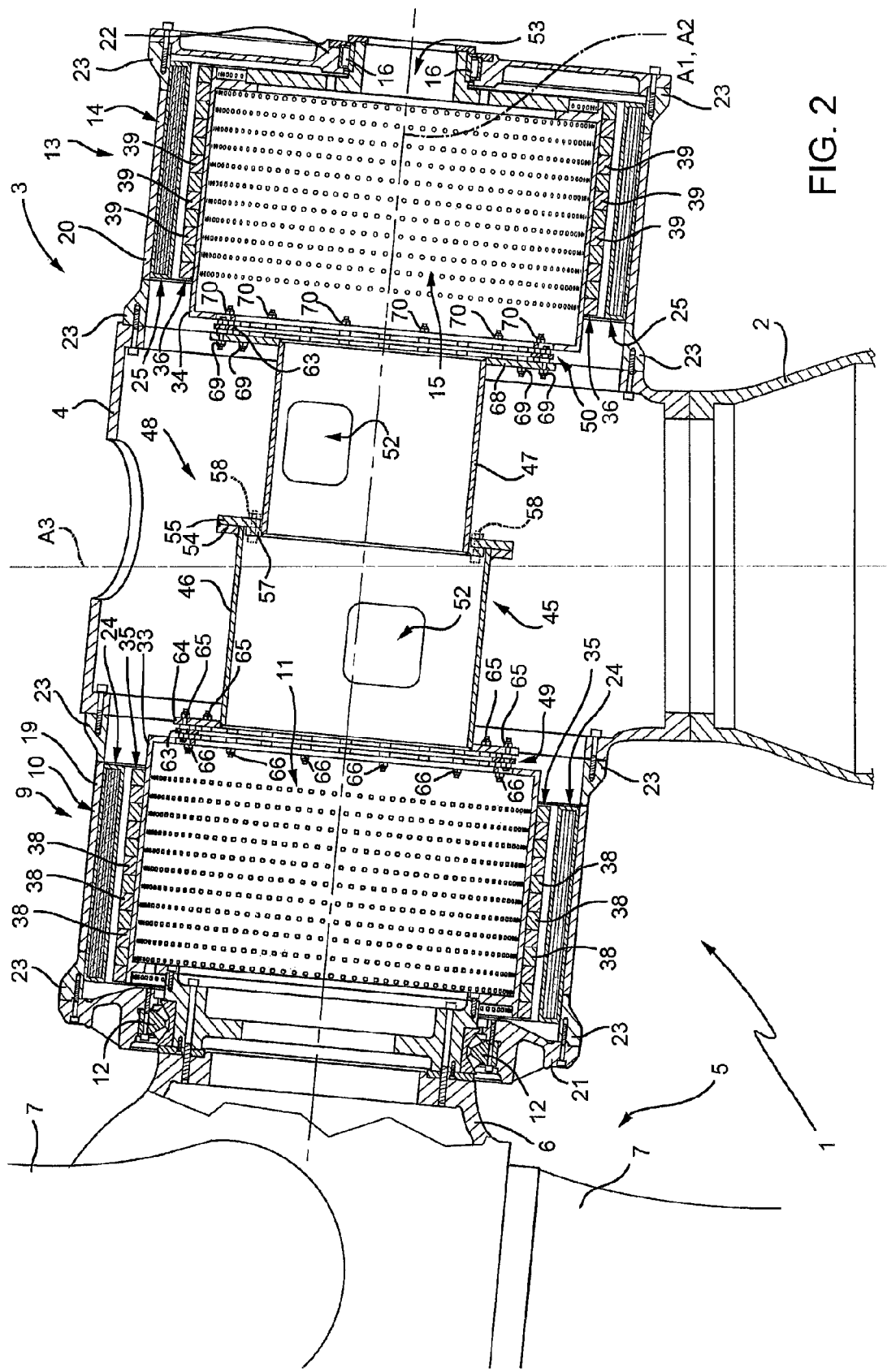
FIG. 2 shows an enlarged, partly sectioned side view, with parts removed for clarity, of a wind power turbine in accordance with a second embodiment of the present disclosure.
Figure 3:
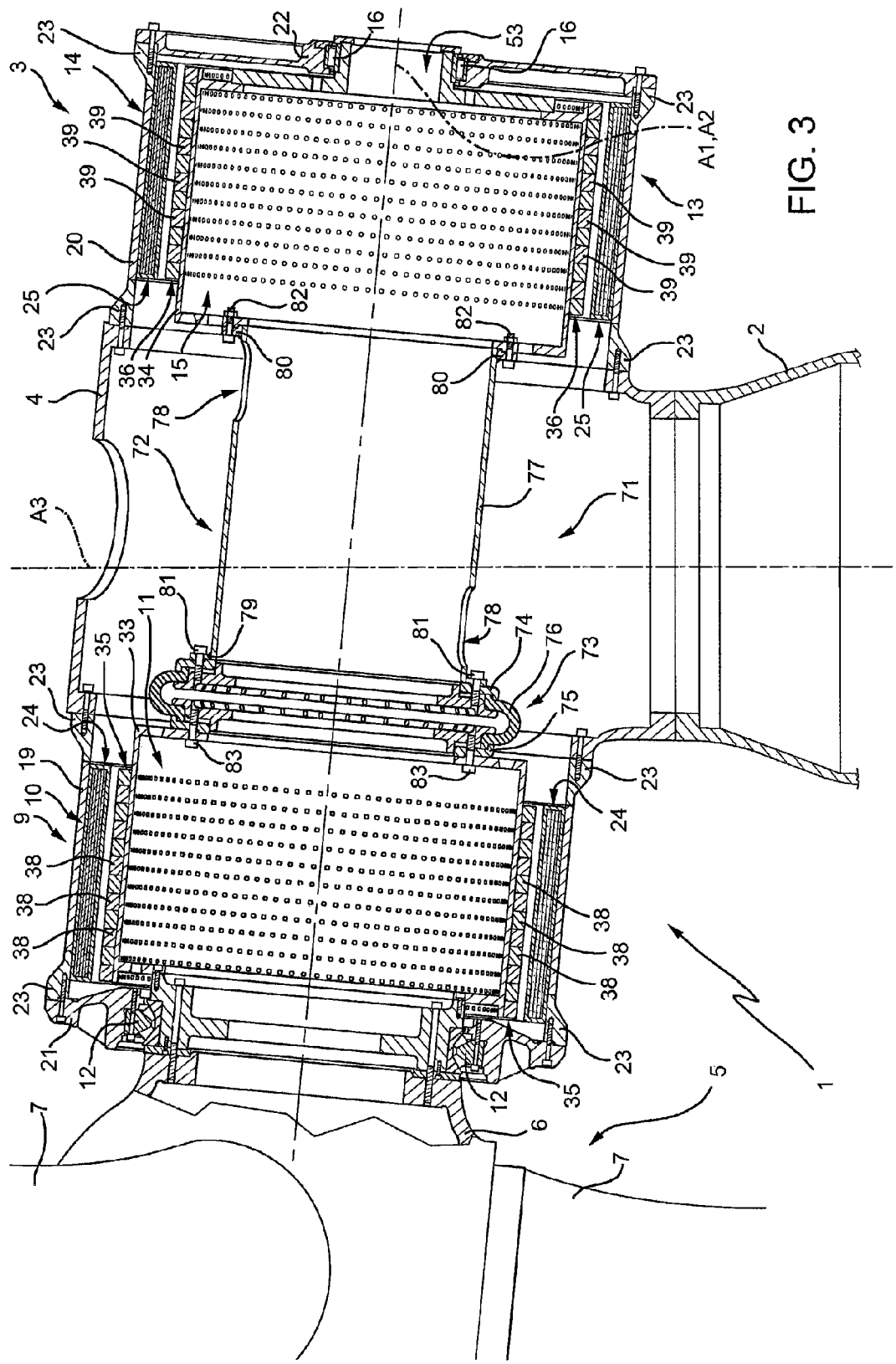
FIG. 3 shows an enlarged, partly sectioned side view, with parts removed for clarity, of a wind power turbine in accordance with a third embodiment of the present disclosure.

Referring now to the example embodiments of the present disclosure illustrated in FIGS. 1 to 3, number 1 indicates a wind power turbine for generating electric energy. For example, as seen in the example of FIGS. 1 to 3, a direct-transmission, variable-angular-speed wind power turbine.

Wind power turbine 1 comprises a supporting structure 2; a nacelle 3 comprising an annular central member 4 fitted in rotary manner to supporting structure 2; and a blade assembly 5 comprising a hub 6 fitted to nacelle 3 to rotate about an axis A1, and a plurality of blades 7, each fitted adjustably in rotary manner to hub 6.

In the example shown in the drawings, axis A1 is substantially horizontal.

Wind power turbine 1 comprises an electric machine 9, in turn comprising an annular stator 10 and an annular rotor 11, which is coupled magnetically to stator 10 and coupled rotatable with respect to stator 10 about axis A1 through a bearing assembly 12. In substance, electric machine 9 is an annular electric generator.

Wind power turbine 1 also comprises an electric machine 13, in turn comprising an annular stator 14 and an annular rotor 15, which is coupled magnetically to stator 14 and coupled rotatable with respect to stator 14 about an axis A2 through a bearing assembly 16. In substance, electric machine 13 is an annular electric generator.

Stators 10 and 14 are substantially coaxial (i.e., have respective substantially coincident axes of symmetry), are spaced apart, and are connected by central member 4, which, in the example shown, is interposed between stators 10 and 14. Rotors 11 and 15 are connected by a transmission assembly 17, which transfers rotation from rotor 11 to rotor 15 as shown in FIG. 1.

Hub 6 is fitted directly to rotor 11 to transfer wind-induced rotation to rotor 11.

Hub 6 is hollow, and has an opening (not shown) outwards of wind power turbine 1 to allow airflow in to cool hub 6, electric machines 9, 13, and transmission assembly 7 (FIG. 1).

Central member 4 is fixed to supporting structure 2 to rotate about an axis A3 and position blade assembly 5 facing the wind.

Stators 10, 14 are cylindrical, and comprise respective hollow stator drums 19, 20; and cooling fins (not shown) fixed to the outer wall of stator drums 19, 20 to cool the outside of electric machines 9, 13.

Nacelle 3 comprises two annular collars 21, 22 fitted contacting respective stator drums 19, 20, and which define the opposite ends of nacelle 3 (i.e., are located on opposite sides of axis A3).

Stator drums 19, 20 have respective flanges 23 for connecting stator drums 19, 20 to central member 4 and annular collars 21, 22.

Stator drums 19, 20, central member 4, and annular collars 21, 22 define the load-bearing structure of nacelle 3.

With reference to FIG. 1, blade assembly 5, rotor 11, transmission assembly 17, and rotor 15 define a rotary assembly housed partly inside nacelle 3. In the example shown, rotor 11, transmission assembly 17, and rotor 15 are housed inside nacelle 3 and supported solely by bearing assemblies 12, 16 at the opposite ends of nacelle 3. Bearing assembly 12 is located at the point where rotor 11 connects to hub 6, while bearing assembly 16 is located at the free end of nacelle 3, next to annular collar 22.

Each stator 10, 14 comprises a respective plurality of axial stator segments 24, 25 evenly distributed about, and fixed to the inner face of, respective stator drum 19, 20. Each stator segment 24, 25 comprises a pack of ferromagnetic plates; and at least one winding fitted solely to the pack of plates, so each stator segment 24, 25 can be extracted—more specifically, extracted axially—from respective stator 10, 14.

Rotors 11, 15 are hollow, and comprise respective rotor drums 33, 34 with inside diameters large enough to allow worker access for inspection or maintenance.

Rotor drums 33, 34 are hollow and cylindrical, and each rotor 11, 15 comprises a respective plurality of rotor segments 35, 36 parallel to and evenly distributed about respective axis A1, A2. Each rotor segment 35, 36 comprises a gripper (not shown) fixed to the outer wall of rotor drum 33, 34, and a respective plurality of permanent magnets 38, 39 fixed to respective rotor drum 33, 34 by the relative gripper, and is extractable parallel to respective axis A1, A2.

In the example shown, electric machines 9, 13 are synchronous, though the present disclosure also applies to any type of rotary electric machine (e.g., asynchronous electric generators with squirrel-cage rotors, or synchronous electric generators with rotors with rotary windings as opposed to permanent magnets).

With reference to FIG. 1, transmission assembly 17 is deformable to permit relative movement between electric machines 9 and 13.

More specifically, transmission assembly 17 is deformable to allow variations in alignment of axes A1 and A2 and/or relative movement between rotors 11 and 15.

With reference to FIG. 1, transmission assembly 17 comprises an annular elastic joint 44; and a transmission shaft 45 comprising a hollow cylinder 46 connected to rotor 11 by elastic joint 44, and a hollow cylinder 47 connected to rotor 15 and to hollow cylinder 46.

Rotor drum 33 is connected directly to blade assembly 5, which, when wind-stressed, may displace rotor drum 33 with respect to stator drum 19.

Stress on blade assembly 5 is caused in various ways. For example, as blade assembly 5 rotates, supporting structure 2 and the blade 7 next to it produce turbulence resulting in asymmetric stress of blade assembly 5. Other forms of stress, capable of producing relative movement between electric machines 9, 13 or parts of them, are caused by gusts of wind on blades 7 or nacelle 3, or by rotation of blade assembly 5 itself.

Elastic joint 44 is elastically deformable, so that, when stress transmitted by blade assembly 5 displaces rotor 11, elastic joint 44 deforms to reduce the stress transmitted to rotor 15.

Hub 6 and rotors 11, 15 are accessible through hollow cylinders 46, 47 and annular elastic joint 44. Accordingly, the inside diameters of hollow cylinders 46, 47 and elastic joint 44 are large enough to allow worker access for inspection or maintenance; and transmission shaft 45 has two openings 52—one for each hollow cylinder 45, 47—large enough in diameter so a worker can enter transmission shaft 45, and move along the inside of transmission shaft 5 into hub 6, through elastic joint 45 and rotor 11, or into rotor 15.

Hub 6, as stated, has the opening (not shown) on the opposite side to rotor 11; and nacelle 3 has a further opening 53 located at rotor 15, on the opposite side to the opening in hub 6, and of such a diameter that the airflow through the opening in hub 6 flows out through further opening 53.

In other words, rotor 11, transmission shaft 45, elastic joint 44, and rotor 15 are designed to allow air to flow through them. Air flows in through the opening in hub 6; flows up to rotor drum 33, thus cooling hub 6 and rotor 11; flows through elastic joint 44 and transmission shaft 45 from rotor drum 33 to rotor drum 34, thus cooling transmission shaft 45 and rotor drum 34; and eventually flows out of rotor drum 34 through further opening 53.

An internal cooling system of wind power turbine 1 is thus defined, in addition to the external cooling system defined by the cooling fins (not shown) for cooling respective stator drums 19, 20.

Transmission shaft 45 is telescopic, and comprises: hollow cylinder 46; an outer end flange 54 fitted to hollow cylinder 46; an outer end flange 55 welded to outer flange 54; hollow cylinder 47 coaxial with hollow cylinder 46; and an outer flange 57 fitted rigidly to hollow cylinder 47 and in sliding manner to hollow cylinder 46, and fixed to outer flange 55 by screws 58 or similar fasteners indicated by dash lines in FIGS. 1 and 2.

Outer flange 57 of hollow cylinder 47 is located inside hollow cylinder 46, so that, when screws 58 are removed, hollow cylinder 47 can slide inside hollow cylinder 46, or hollow cylinder 46 can slide on the outside of hollow cylinder 47, into one of operating positions. Outer flange 55 defines a stop for hollow cylinder 47 or 46 (i.e., rests against outer flange 57) when hollow cylinder 47 is not inserted inside hollow cylinder 46.

A first operating position is defined when hollow cylinder 46 is connected to rotor 11, and hollow cylinder 47 is connected to rotor 15.

In the first operating position, hollow cylinders 46 and 47 only overlap at respective ends, for connection by screws 58, as shown in FIGS. 1 and 2.

In the first operating position, transmission shaft 45 transmits rotation from rotor 11 to rotor 15 via hollow cylinders 46 and 47.

A second operating position (not shown) is defined when hollow cylinder 46 is fixed to rotor 11, and hollow cylinder 47 is not fixed to rotor 15 and is slid inside hollow cylinder 46. In which case, transmission shaft 45 does not transmit rotation from rotor 11 to rotor 15, and only electric machine 9 is running.

A third operating position (not shown) is defined when hollow cylinder 47 is fixed to rotor 15, and hollow cylinder 46 is not connected to rotor 11 and is slide on the outside of hollow cylinder 47. In which case, transmission shaft 45 does not transmit rotation from rotor 11 to rotor 15, and only electric machine 9 is running.

In the first embodiment in FIG. 1, elastic joint 44 comprises a plurality of elastic blocks 60 comprising elastomeric material, such as rubber or adiprene. In a variation of the present disclosure, elastic blocks 60 comprise reinforcing structures, such as wire mesh or cloth, embedded in the elastomeric material.

Elastic blocks 60 are interposed between hollow cylinder 46 and rotor 11, so hollow cylinder 46 and rotor 11 are connected functionally, but not in direct contact. Having elastic properties, elastic blocks 60 deform when subjected to flexural and/or compressive and/or tensile and/or torsional stress, and so transmit rotation from rotor 11 to hollow cylinder 46, but reduce the stress, and also dampen vibration, transmitted from rotor 11 to hollow cylinder 46.

Transmission assembly 17 comprises an end flange 61 fitted to hollow cylinder 46 and facing rotor drum 33. End flange 61 is fixed to elastic blocks 60 by fasteners 62, and rotor drum 33 is fixed to elastic blocks 60 by fasteners 62.

Transmission assembly 17 comprises an end flange 51 fitted rigidly to hollow cylinder 47 and facing rotor drum 34; and fasteners 56 for connecting end flange 51 reversibly to rotor drum 34.

Hollow cylinders 46, 47, annular elastic joint 44, outer flanges 54, 55, 57, and end flanges 61, 51 have outside diameters smaller than the diameters of rotor drums 33, 34, so rotor segments 35, 36 and stator segments 24, 25 are extractable, parallel to respective axes A1, A2, from central member 4.

In one alternative embodiment (not shown), elastic blocks 60 are interposed between hollow cylinder 47 and rotor drum 34, and stress reaches transmission shaft 45 unchanged, and is reduced by elastic blocks 60.

In another alternative embodiment (not shown), elastic blocks 60 are interposed between hollow cylinder 46 and rotor drum 33, and also between hollow cylinder 47 and rotor drum 34.

In a second embodiment, shown in FIG. 2, of the present disclosure, transmission assembly 17 is replaced with a transmission assembly 48, which comprises transmission shaft 45 as in FIG. 1; and two annular elastic joints 49, 50, each comprising a plurality of metal plates 63.

Transmission assembly 48 comprises an end flange 64 fitted rigidly to hollow cylinder 46 and facing rotor drum 33; and an end flange 68 fitted rigidly to hollow cylinder 47 and facing rotor drum 34.

Elastic joint 49 is interposed between rotor drum 33 and end flange 64 of hollow cylinder 46; transmission assembly 48 comprises fasteners 65 for connecting end flange 64 to metal plates 63 of elastic joint 49; and rotor 11 comprises fasteners 66 for connecting rotor drum 33 to metal plates 63 of elastic joint 49.

Elastic joint 50 is interposed between rotor drum 34 and end flange 68 of hollow cylinder 47; transmission assembly 48 comprises fasteners 69 for connecting end flange 68 to metal plates 63 of elastic joint 50; and rotor 15 comprises fasteners 70 for connecting rotor drum 34 to metal plates 63 of elastic joint 50.

Transmission shaft 45—more specifically, hollow cylinders 46 and 47—is therefore connected functionally to rotor drums 33 and 34, to transfer rotation from one to the other.

Being elastically deformable, metal plates 63 of elastic joints 49, 50 deform when subjected to flexural and/or compressive and/or tensile stress, and so transmit rotation, and reduce the stress transmitted, from rotor 11 to hollow cylinder 46, and from hollow cylinder 47 to rotor 15 respectively.

Elastic joints 49, 50 and end flanges 64, 68 are smaller in outside diameter than rotor drums 33, 34.

In a variation of the above embodiment of the present disclosure, the transmission assembly comprises only one of elastic joints 49, 50, and the other elastic joint is replaced with a rigid joint.

In a third embodiment, shown in FIG. 3, of the present disclosure, the FIG. 1 transmission assembly 17 is replaced with a transmission assembly 71, which comprises a transmission shaft 72; and an annular elastic joint 73 comprising two annular plates 74, 75, and a ring 76 comprising elastomeric material, such as rubber or adiprene. In a variation of the present disclosure, ring 76 comprises a reinforcing structure, such as wire mesh or cloth, embedded in the elastomeric material.

Annular plates 74, 75 are connected by ring 76.

Transmission shaft 72 comprises a hollow cylinder 77 with two openings 78 large enough in diameter to allow worker access to the inside of hollow cylinder 77.

Transmission assembly 71 comprises an outer end flange 79 fitted rigidly to hollow cylinder 77 and facing elastic joint 73; and an outer end flange 80 fitted rigidly to hollow cylinder 77 and facing rotor drum 34.

Annular plates 74, 75, ring 76, and hollow cylinder 77 have inside diameters large enough to allow worker access for inspection or maintenance, and to allow airflow from rotor drum 33 to rotor drum 34.

Hollow cylinder 77, end flanges 79, 80, annular plates 74, 75, and ring 76 have outside diameters smaller than the inner diameters of rotor drums 33, 34, so rotor segments 35, 36 and stator segments 24, 25 are extractable, parallel to respective axes A1, A2, from central member 4.

Transmission assembly 71 comprises fasteners 81 for fixing end flange 79 reversibly to annular plate 74; and fasteners 82 for fixing end flange 80 reversibly to rotor drum 34. Transmission assembly 71 also comprises fasteners 83 for fixing annular plate 75 reversibly to rotor drum 33.

In actual use, wind-induced rotation is transferred to rotor drum 33, and elastic joint 73 transfers rotation from rotor drum 33 to transmission shaft 72, and reduces stress. More specifically, ring 76 of elastic joint 73 deforms when subjected to flexural and/or compressive and/or tensile and/or torsional stress, and so reduces stress transmitted from rotor drum 33 to transmission shaft 72.

In another embodiment, elastic joint 73 is interposed between transmission shaft 72 and rotor drum 34, and rotor drum 33 is connected rigidly to transmission shaft 72.

In another embodiment, the ring of the elastic joint has convex portion facing inwards of the transmission assembly, and concave portion facing outwards of the transmission assembly.

In another embodiment, transmission assembly 71 comprises a further elastic joint 73 interposed between transmission shaft 72 and rotor drum 34.

Axes A1 and A2 are coincident in the attached drawings, but, in actual fact and use, may assume non-coincident positions.

In addition to those stated, the present disclosure also has the advantage of each electric machine 9, 13 being produced and tested independently of the other, and then fitted to central member 4.

Clearly, changes may be made to the wind power turbine as described herein without, however, departing from the scope of the accompanying Claims. Such changes and modifications can be made without departing from the spirit and scope of the present subject matter and without diminishing its intended advantages. It is therefore intended that such changes and modifications be covered by the appended claims.

The invention is claimed as follows:

1. An electric energy generating wind power turbine including a supporting structure, a nacelle, and a blade assembly configured to rotate with respect to the nacelle, said wind power turbine comprising:
    a first electric machine including:
        a first stator, and
        a first rotor fitted to the first stator, said first rotor configured to rotate about a first axis;
    a second electric machine including:
        a second stator substantially coaxial with the first stator, and
        a second rotor fitted to the second stator, said second rotor configured to rotate about a second axis; and
    a transmission assembly connecting the first rotor to the second rotor, said transmission assembly including at least one elastic joint and a transmission shaft, said at least one elastic joint being interposed between the transmission shaft and at least one of the first rotor and the second rotor, and said transmission assembly being deformable to permit relative movement between the first electric machine and the second electric machine.

2. The electric energy generating wind power turbine of claim 1, wherein the at least one elastic joint includes a plurality of elastic blocks of elastomeric material interposed between the transmission shaft and at least one of the first rotor and the second rotor.

3. The electric energy generating wind power turbine of claim 2, wherein each elastic block includes a reinforcing structure incorporated in the elastomeric material.

4. The electric energy generating wind power turbine of claim 1, wherein the at least one elastic joint includes a ring comprising elastomeric material.

5. The electric energy generating wind power turbine of claim 4, wherein the ring includes a reinforcing structure incorporated in the elastomeric material.

6. The electric energy generating wind power turbine of claim 4, wherein the ring has substantially the same diameter as the transmission shaft.

7. The electric energy generating wind power turbine of claim 1, wherein the at least one elastic joint includes at least one metal plate.

8. The electric energy generating wind power turbine of claim 1, wherein:
    the first electric machine and the second electric machine are annular generators;
    the first rotor includes a first hollow rotor drum;
    the second rotor includes a second hollow rotor drum;
    the transmission shaft includes a hollow cylinder; and
    the at least one elastic joint is annular and configured to connect the inside of the first rotor to the inside of the second rotor.

9. The electric energy generating wind power turbine of claim 8, wherein:
the hollow cylinder and the at least one elastic joint have respective outside diameters smaller than the outside diameter of the first hollow rotor drum and the second hollow rotor drum;
the first rotor and the second rotor are each divided into a plurality of rotor segments; and
the first stator and the second stator are each divided into a plurality of stator segments.

10. The electric energy generating wind power turbine of claim 8, wherein the hollow cylinder and at least one the elastic joint have respective inside diameters configured to allow passage by an operator.

11. The electric energy generating wind power turbine of claim 8, wherein the hollow cylinder has at least one lateral opening configured to allow an operator access to the inside of the hollow cylinder.

12. The electric energy generating wind power turbine of claim 8, wherein the transmission shaft includes a further hollow cylinder coaxial with and connected reversibly to the hollow cylinder.

13. The electric energy generating wind power turbine of claim 12, wherein the hollow cylinder and the further hollow cylinder are configured to slide axially with respect to each other.

14. The electric energy generating wind power turbine of claim 13, wherein when at least one of the hollow cylinder and the further hollow cylinder slide toward the other of the hollow cylinder and the further hollow cylinder, the second rotor does not rotate about the second axis when wind causes the blade assembly to rotate.

15. The electric energy generating wind power turbine of claim 1, including:
a first bearing assembly located at a first end of the nacelle, and
a second bearing assembly located at a second, opposite end of the nacelle.

16. The electric energy generating wind power turbine of claim 15, wherein the first rotor, the second rotor and the transmission assembly are supported solely by the first bearing assembly and the second bearing assembly.

17. The electric energy generating wind power turbine of claim 1, wherein said transmission assembly is deformable to permit the first electric machine to move towards and away from the second electric machine.

18. An electric energy generating wind power turbine comprising:
a supporting structure;
a nacelle;
a blade assembly configured to rotate with respect to the nacelle;
a first electric machine including a first stator and a first rotor fitted to the first stator;
a second electric machine including a second stator and a second rotor fitted to the second stator; and
a transmission assembly connecting the first rotor to the second rotor, said transmission assembly including at least one elastic joint and a transmission shaft, said at least one elastic joint being interposed between the transmission shaft and at least one of the first rotor and the second rotor, said transmission assembly configured to: (i) permit the first electric machine to move towards and away from the second electric machine, and (ii) permit the first electric machine to move towards and away from the supporting structure.

19. An electric energy generating wind power turbine transmission assembly comprising:
a transmission shaft configured to connect a first rotor of a first electric machine to a second rotor of a second electric machine, said first rotor fitted to a first stator and configured to rotate about a first axis and said second rotor fitted to a second stator substantially coaxial with the first stator and configured to rotate about a second axis; and
at least one elastic joint interposed between the transmission shaft and at least one of the first rotor and the second rotor, said at least one elastic joint being deformable to permit relative movement between the first electric machine and the second electric machine.

20. An electric energy generating wind power turbine including a supporting structure, a nacelle, and a blade assembly configured to rotate with respect to the nacelle, said wind power turbine comprising:
a first electric machine including:
a first stator, and
a first rotor fitted to the first stator, said first rotor configured to rotate about a first axis;
a second electric machine including:
a second stator substantially coaxial with the first stator, and
a second rotor fitted to the second stator, said second rotor configured to rotate about a second axis; and
a transmission assembly connecting the first rotor to the second rotor, said transmission assembly including at least one elastic joint and a transmission shaft, the at least one elastic joint including a plurality of elastic blocks of elastomeric material interposed between the transmission shaft and at least one of the first rotor and the second rotor, and said transmission assembly being deformable to permit relative movement between the first electric machine and the second electric machine.

21. The electric energy generating wind power turbine of claim 20, wherein each elastic block includes a reinforcing structure incorporated in the elastomeric material.

22. An electric energy generating wind power turbine including a supporting structure, a nacelle, and a blade assembly configured to rotate with respect to the nacelle, said wind power turbine comprising:
a first electric machine including:
a first stator, and
a first rotor fitted to the first stator, said first rotor configured to rotate about a first axis;
a second electric machine including:
a second stator substantially coaxial with the first stator, and
a second rotor fitted to the second stator, said second rotor configured to rotate about a second axis; and
a transmission assembly connecting the first rotor to the second rotor, said transmission assembly including at least one elastic joint and a transmission shaft, the at least one elastic joint including a ring including elastomeric material, the ring having substantially the same diameter as the transmission shaft, and said transmission assembly being deformable to permit relative movement between the first electric machine and the second electric machine.

23. An electric energy generating wind power turbine including a supporting structure, a nacelle, and a blade assembly configured to rotate with respect to the nacelle, said wind power turbine comprising:
a first electric machine including:
a first stator, and a first rotor fitted to the first stator, said first rotor configured to rotate about a first axis;
a second electric machine including:
a second stator substantially coaxial with the first stator, and
a second rotor fitted to the second stator, said second rotor configured to rotate about a second axis; and
a transmission assembly connecting the first rotor to the second rotor, said transmission assembly including at least one elastic joint and a transmission shaft, the at least one elastic joint including at least one metal plate, and said transmission assembly being deformable to permit relative movement between the first electric machine and the second electric machine.

24. An electric energy generating wind power turbine including a supporting structure, a nacelle, and a blade assembly configured to rotate with respect to the nacelle, said wind power turbine comprising:
a first annular generator electric machine including:
a first stator, and
a first rotor fitted to the first stator and including a first hollow rotor drum, said first rotor configured to rotate about a first axis;
a second annular generator electric machine including:
a second stator substantially coaxial with the first stator, and
a second rotor fitted to the second stator and including a second hollow rotor drum, said second rotor configured to rotate about a second axis; and
a transmission assembly connecting the first rotor to the second rotor, said transmission assembly including at least one annular elastic joint and a transmission shaft including a hollow cylinder, the at least one annular elastic joint configured to connect the inside of the first rotor to the inside of the second rotor, and said transmission assembly being deformable to permit relative movement between the first electric machine and the second electric machine.

25. The electric energy generating wind power turbine of claim 24, wherein:
the hollow cylinder and the at least one elastic joint have respective outside diameters smaller than the outside diameter of the first hollow rotor drum and the second hollow rotor drum;
the first rotor and the second rotor are each divided into a plurality of rotor segments; and
the first stator and the second stator are each divided into a plurality of stator segments.

26. The electric energy generating wind power turbine of claim 24, wherein the hollow cylinder and at least one the elastic joint have respective inside diameters configured to allow passage by an operator.

27. The electric energy generating wind power turbine of claim 24, wherein the hollow cylinder has at least one lateral opening configured to allow an operator access to the inside of the hollow cylinder.

28. The electric energy generating wind power turbine of claim 24, wherein the transmission shaft includes a further hollow cylinder coaxial with and connected reversibly to the hollow cylinder.

29. The electric energy generating wind power turbine of claim 28, wherein the hollow cylinder and the further hollow cylinder are configured to slide axially with respect to each other.

30. The electric energy generating wind power turbine of claim 29, wherein when at least one of the hollow cylinder and the further hollow cylinder slide toward the other of the hollow cylinder and the further hollow cylinder, the second rotor does not rotate about the second axis when wind causes the blade assembly to rotate.

31. An electric energy generating wind power turbine including a supporting structure, a nacelle, and a blade assembly configured to rotate with respect to the nacelle, said wind power turbine comprising:
a first electric machine including:
a first stator including a first hollow stator drum at least partly defining a load-bearing structure of said nacelle, and
a first rotor fitted to the first stator, said first rotor configured to rotate about a first axis;
a second electric machine including:
a second stator substantially coaxial with the first stator and including a second hollow stator drum connected to the first hollow stator drum and at least partly defining the load-bearing structure of said nacelle which includes a central member fitted to the supporting structure and configured to rotate about a third axis, said central member being interposed between the first stator drum and the second stator drum such that the first electric machine and the second electric machine are located on opposite sides of the third axis, and
a second rotor fitted to the second stator, said second rotor configured to rotate about a second axis; and
a transmission assembly connecting the first rotor to the second rotor, said transmission assembly being deformable to permit relative movement between the first electric machine and the second electric machine.

* * * * *